(No Model.)

F. J. HERRICK.
HAMMOCK ATTACHMENT.

No. 490,250. Patented Jan. 17, 1893.

Witnesses.
Edward W. Bush
C. Darwin Loomis Jr.

Inventor.
Frank J. Herrick
By James Shepard.
Atty.

UNITED STATES PATENT OFFICE.

FRANK J. HERRICK, OF NEW BRITAIN, CONNECTICUT, ASSIGNOR TO THE NORTH & JUDD MANUFACTURING COMPANY, OF SAME PLACE.

HAMMOCK ATTACHMENT.

SPECIFICATION forming part of Letters Patent No. 490,250, dated January 17, 1893.

Original application filed June 27, 1892, Serial No. 438,074. Divided and this application filed August 20, 1892. Serial No. 443,634.

(No model.)

*To all whom it may concern:*

Be it known that I, FRANK J. HERRICK, a citizen of the United States, residing at New Britain, in the county of Hartford and State of Connecticut, have invented certain new and useful Improvements in Attachments for Hammock-Ropes, of which the following is a specification.

My invention relates to improvements in attachments for hammock ropes, and the objects of my improvement are simplicity and cheapness of construction and general convenience and efficiency of the article.

Figure 1:
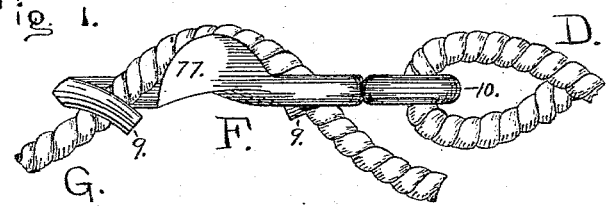
Figure 2:
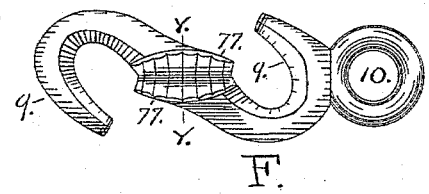
Figure 3:

In the accompanying drawings, Figure 1 is a side elevation of the attachment at the hammock end of the rope, together with a portion of said rope. Fig. 2 is a plan view of the same, and—Fig. 3 is a transverse section thereof on the line $y\,y$ of Fig. 2.

On the end D of the rope I secure what I call the hammock end attachment F. This consists of a body portion having flanges 77, with a space between them for the rope. At each end of this flanged body portion I form hooks 9 with their ends open and somewhat turned to one side from the body as shown in Fig. 1. At the end of one of these hooks I form a ring or rope eye 10 for the attachment of the rope end D. This rope end D and the hammock end attachment thereon are passed through the end of the hammock and brought back to the desired point on the middle portion of the rope G when said middle portion of the rope can be passed into the open ends of the hooks and into the space between the flanges 77. Upon straining the rope as shown in Fig. 1. the attachment will be firmly secured at said point without any liability of slipping. Neither is the rope liable to become accidentally detached as the curved ends of the hooks are turned away from the flanged body 77 so that there is no danger of accidental displacement so long as the rope is taut.

This hammock attachment is cheap and simple, and it can be attached to and detached from the middle portion of a rope to fasten it at any desired point thereon.

I claim as my invention—

1. The herein described hammock end attachment consisting of the body having flanges 77, with an open hook 9 at each end thereof and the rope eye 10 at the end of one of said hooks, substantially as described and for the purpose specified.

2. The herein described hammock end attachment consisting of the body having flanges 77, the hooks 9 at each end of said body with the ends of said hooks left open and curved away from said flanges and the rope eye 10 at the end of one of said hooks, substantially as described and for the purpose specified.

FRANK J. HERRICK.

Witnesses:
C. H. AVERY,
JAMES SHEPARD.